United States Patent
Nagata et al.

(10) Patent No.: US 11,151,387 B2
(45) Date of Patent: Oct. 19, 2021

(54) CAMERA SYSTEM TO DETECT UNUSUAL ACTIVITIES

(71) Applicant: Toyota Motor Engineering & Manufacturing North America, Inc., Plano, TX (US)

(72) Inventors: Katsumi Nagata, Foster City, CA (US); Shojiro Takeuchi, Saratoga, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/376,992

(22) Filed: Apr. 5, 2019

(65) Prior Publication Data

US 2020/0320309 A1 Oct. 8, 2020

(51) Int. Cl.
*G06K 9/00* (2006.01)
*H04N 7/18* (2006.01)
*G08B 13/196* (2006.01)

(52) U.S. Cl.
CPC ... *G06K 9/00758* (2013.01); *G08B 13/19602* (2013.01); *H04N 7/183* (2013.01)

(58) Field of Classification Search
CPC ............ C12Q 1/6827; C12Q 2521/301; C12Q 2525/205; C12Q 1/6804; C12Q 1/686; G08B 13/19602; G08B 13/19608; G08B 13/19613; G08B 13/19697; H04N 5/76; H04N 7/188; H04N 7/186; H04N 7/183; G06K 9/00758
USPC .................................. 348/113–119, 142–160
See application file for complete search history.

(56) References Cited

U.S. PATENT DOCUMENTS

| | | | |
|---|---|---|---|
| 5,027,104 A | 6/1991 | Reid | |
| 5,666,157 A * | 9/1997 | Aviv | G08B 13/19602 348/150 |
| 5,877,897 A * | 3/1999 | Schofield | B60R 1/12 359/604 |
| 6,570,609 B1 | 5/2003 | Heien | |
| 9,335,766 B1 * | 5/2016 | Silver | G01S 17/04 |
| 9,491,420 B2 | 11/2016 | Mirmar | |
| 9,607,518 B2 | 3/2017 | Kwak et al. | |
| 9,633,576 B2 | 4/2017 | Reed | |

(Continued)

FOREIGN PATENT DOCUMENTS

WO WO2017180900 10/2017

*Primary Examiner* — Matthew K Kwan
(74) *Attorney, Agent, or Firm* — Snell & Wilmer LLP

(57) ABSTRACT

Methods, systems, and apparatus for a detection system. The detection system includes a first camera configured to capture a first image data of a surrounding environment. The first image data includes multiple objects. The detection system includes a memory configured to store image data. The detection system includes an electronic control unit. The electronic control unit is configured to obtain the first image data. The electronic control unit is configured to recognize the multiple objects. The electronic control unit is configured to determine that an object among the multiple objects within the surrounding environment is different than a baseline of the surrounding environment. The electronic control unit is configured to record and capture, in the memory and using the camera, the first image data for a time period before and after the determination that the object is different than the baseline.

19 Claims, 6 Drawing Sheets

(56) References Cited

U.S. PATENT DOCUMENTS

| | | |
|---|---|---|
| 9,718,357 B2 | 8/2017 | DeLine et al. |
| 9,779,311 B2 | 10/2017 | Lee et al. |
| 9,922,471 B2 | 3/2018 | Joodaki et al. |
| 10,134,280 B1 | 11/2018 | You |
| 10,166,949 B1 | 1/2019 | Selim |
| 2006/0250501 A1 | 11/2006 | Widmann et al. |
| 2008/0204556 A1 | 8/2008 | de Miranda et al. |
| 2014/0092249 A1* | 4/2014 | Freiburger ............. B60Q 11/00 348/148 |
| 2014/0126779 A1 | 5/2014 | Duda |
| 2015/0091713 A1 | 4/2015 | Kohlenberg et al. |
| 2018/0005407 A1* | 1/2018 | Browning ............ G05D 1/0246 |

\* cited by examiner

CAMERA SYSTEM TO DETECT UNUSUAL ACTIVITIES

BACKGROUND

Field

This disclosure relates to detecting, predicting and documenting any unusual or suspicious activities near or directed at a parked vehicle.

Description of the Related Art

Generally, vehicle anti-theft devices are reactive systems that perform an act, such as sound an alarm or initiate a countermeasure, in response to a physical action performed on the vehicle. For example, a vehicle anti-theft device may include an alarm that sounds when a person tampers with the window or lock of the vehicle. In another example, when an individual or object contacts the vehicle or attempts to open the door without using a key to unlock the door, the vehicle may sound an alarm. These anti-theft devices only alert the surrounding area of the malicious action that has occurred or is currently taking place. The anti-theft devices do not prevent the malicious action nor do the anti-theft devices provide any record of the incident for later analysis, and thus, even though the anti-theft device may alert the surrounding environment of the malicious action, very little may be done to prevent the malicious action or mitigate any consequences.

Accordingly, there is a need for a system and method for anticipating, predicting and/or reporting unusual activities surrounding the vehicle.

SUMMARY

In general, one aspect of the subject matter described in this disclosure may be embodied in a detection system for a vehicle. The detection system includes a first camera configured to capture a first image data of a surrounding environment. The first image data includes multiple objects within the surrounding environment. The detection system includes a memory configured to store image data. The detection system includes an electronic control unit coupled to the camera and the memory. The electronic control unit is configured to obtain, from the camera, the first image data of the surrounding environment. The electronic control unit is configured to recognize the multiple objects within the surrounding environment. The electronic control unit is configured to determine that an object among the multiple objects within the surrounding environment is different than a baseline of the surrounding environment. The electronic control unit is configured to record and capture, in the memory and using the camera, the first image data for a time period before and after the determination that the object is different than the baseline.

These and other embodiments may optionally include one or more of the following features. The first camera may include multiple external cameras. The multiple external cameras may be configured to capture different views of the surrounding environment. The electronic control unit may be configured to determine multiple motions of the object within the baseline of the surrounding environment. The electronic control unit may be configured to determine multiple other objects coupled to the object within the baseline of the surrounding environment.

The electronic control unit may be configured to compare the object to different baseline objects within the baseline of the surrounding environment and determine that the object does not match any of the different baseline objects. The electronic control unit may be configured to compare a motion of the object with different motions of the baseline object. The electronic control unit may be configured to determine that the motion of the object does not match any of the different motions of the baseline object.

The detection system may include a second camera. The second camera may be configured to capture a second image data. The first image data may be an external video of the surrounding environment. The second image data may be an internal video within the vehicle. The electronic control unit may be configured to record and capture, in the memory and using the first camera, the first image data for a time period in response to the determination that the object is different than the baseline. The electronic control unit may be configured to record and capture, in the memory and using the second camera, the second image data for the time period in response to the determination that the object is different than the baseline.

In another aspect, the subject matter may be embodied in a detection system for a vehicle. The detection system includes an external camera. The external camera is configured to capture a first image data of an environment outside the vehicle. The first image data includes multiple objects within the environment outside the vehicle. The detection system includes an internal camera. The internal camera is configured to capture a second image data of an environment inside the vehicle. The detection system includes a memory. The memory is configured to store the first image data and the second image data. The detection system includes an electronic control unit. The electronic control unit is coupled to the external camera, the internal camera and the memory. The electronic control unit is configured to obtain, from the external camera, the first image data. The electronic control unit is configured to recognize multiple objects within the environment outside the vehicle. The electronic control unit is configured to determine that an object among the multiple object or an action of the object within the environment outside the vehicle is unusual. The electronic control unit is configured to record and capture, in the memory and using the first camera and the second camera, the first image data and the second image data for a time period before and after the determination that the object is unusual.

In another aspect, the subject matter may be embodied in a method for detecting unusual activities. The method includes obtaining, from a first camera, a first image data of the surrounding environment. The method includes recognizing multiple objects within the surrounding environment. The method includes determining that an object among the multiple objects within the surrounding environment is different than a baseline of the surrounding environment. The method includes recording and capturing, in the memory and using the first camera, the first image data for a time period before and after the determination that the object is different than the baseline.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for detecting unusual activities. Particular embodiments of the subject matter described this disclosure may be implemented to realize one or more of the following advantages. The unusual or suspicious activities detection, recording and reporting system ("detection system") detects, records and/or reports unusual or suspicious activities ("unusual activity") that occur around, in proximity and/or within the external environment of the vehicle. The detection system uses artificial intelligence including machine algorithm learning models to anticipate, predict or otherwise determine when an unusual activity occurs or is about to occur. By anticipating, predicting or otherwise determining when the unusual activity occurs or is about to occur, the detection system proactively anticipates the unusual activity and may act to prevent, report or otherwise record or document the unusual activity. For example, the detection system may alert the police to apprehend a suspicious person and/or prevent any malicious activity. In another example, the detection system may alert the surrounding area in an attempt to prevent the malicious activity and/or record the malicious activity to mitigate consequences of the malicious activity such as, by providing a record of the malicious activity to identify the suspect and/or any damages.

Other benefits and advantages include the capability to adapt to different environmental factors and/or circumstances of the environment. By using artificial intelligence in predicting the unusual activity, the detection system may account for various environmental factors, such as the time of day, the location, the weather and/or other factors, in the prediction. This allows for a more precise and accurate understanding of different types of unusual activities. The detection system may learn from each instance of a potentially unusual activity.

Figure 1:
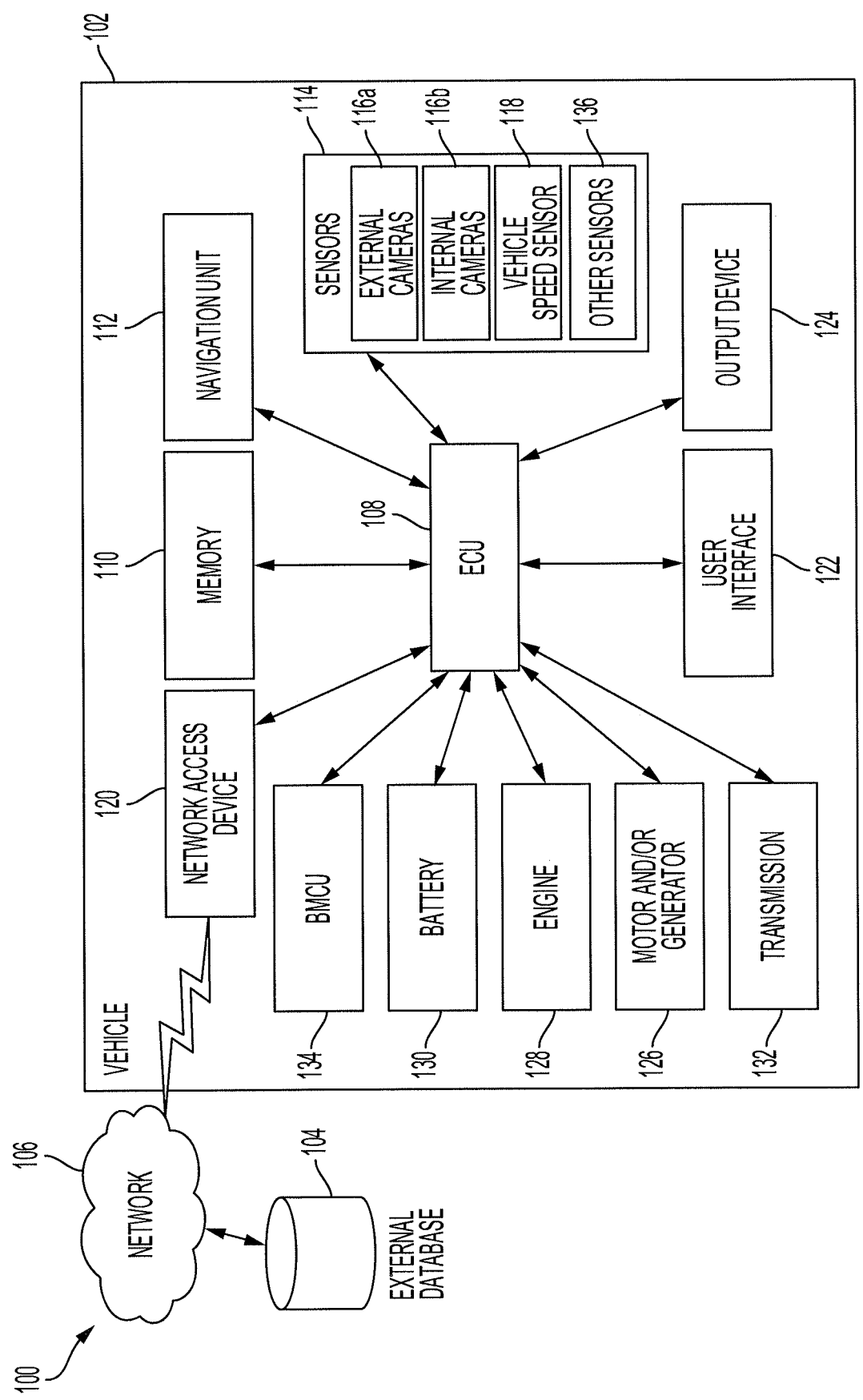
FIG. 1 is a block diagram of an example detection system according to an aspect of the invention.

FIG. 1 is a block diagram of a detection system 100. The detection system 100 may be retro-fitted, coupled to, include or be included within a vehicle 102. The detection system 100 may couple, connect to, or include an external database 104. The detection system 100 may have a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The detection system 100 detects, identifies, predicts and/or anticipates unusual and suspicious activity that occurs and/or may potentially occur in the near future within or surrounding and/or inside the vehicle 102. The detection system 100 may use artificial intelligence including a machine learning algorithm to predict when an unusual object or action of the object may impact, damage or present a danger to the vehicle 102.

The detection system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous. That is, the vehicle 102 may be self-maneuvering and navigate without human input. An autonomous vehicle may have and use one or more sensors and/or a navigation unit to drive autonomously.

The detection system 100 includes one or more processors, such as an electronic control unit (ECU) 108 and a memory 110. The detection system 100 may include other components, such as a navigation unit 112, one or more sensors 114 including one or more external cameras 116a, one or more internal cameras 116b, a Vehicle speed sensor 118 and/or other sensors 136, a network access device 120, a user interface 122 and/or an output device 124. The detection system 100 may couple, connect to, and/or include one or more vehicle components such as the motor and/or generator 126, the engine 128, the battery 130, the transmission 132 and/or the battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120 and/or one or more sensors 114. The ECU 108 may include one or more processors or controllers specifically designed for predicting unusual activities within the surrounding environment of the vehicle 102 and within the vehicle. The unusual activities may be external to the vehicle 102 and/or internal to the vehicle 102. The ECU 108 may generate predictive models and use machine learning algorithms to anticipate unusual activities before the unusual activities occur.

An unusual activity may be any object that is not normally within the external and/or internal environment of the vehicle. That is, the object is not within the baseline representation or model of the environment, and thus, may be considered unusual, suspicious or otherwise not normal. The unusual activity may also be an action or motion performed or about to be performed by an object that is not normal within the external and/or internal environment of the vehicle. That is, the action of the object is not within the baseline representation, model or behavior expected of the object within the environment, and thus, may be considered unusual, suspicious or otherwise not normal.

The ECU 108 may analyze the external and internal environment of the vehicle 102 and compare the data to a baseline and/or input the data into a model to anticipate, predict or otherwise determine any unusual activities within the environment. If an unusual activity is predicted or otherwise detected, the ECU 108 may act to record, document, provide or otherwise act to mitigate consequences of the unusual activity. The ECU 108 may be coupled to a memory 110 and execute instructions that are stored in the memory 110.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store image data before, after and/or during the occurrence of the unusual activity to document the unusual activity.

The detection system 100 may include a user interface 122. The detection system 100 may display one or more notifications on the user interface 122. The one or more notifications on the user interface 122 may notify occupants of the vehicle when the detection system 100 is initialized or activated. The user interface 122 may include an input/output device that receives user input from a user interface element, a button, a dial, a microphone, a keyboard, or a touch screen. For example, the user interface 122 may receive user input that may include configurations as to the amount of image data or the length of the video to record when an unusual activity is detected. Other configurations may include a sensitivity to the surrounding environment as to when to trigger the activation of the cameras 116*a-b*, for example. The user interface 122 may provide an output to an output device, such as a display, a speaker, an audio and/or visual indicator, or a refreshable braille display. For example, the user interface 122 may playback recording on a user display.

The detection system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain baseline models of activities and objects at a current location of the vehicle 102, via the network 106. The detection system 100 may use the baseline models to extrapolate the unusualness of an object, coupled object or motion of the object to anticipate, predict or determine unusual activities surrounding the vehicle 102.

The detection system may include a navigation unit 112 and/or one or more sensors 114. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. In some implementations, the vehicle 102 may include a Global Positioning System (GPS) unit (not shown) for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations. Other information, such as a current speed of the vehicle 102, may be extrapolated, interpreted or otherwise calculated from the data obtained from the navigation unit.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations or places of interest, such as government buildings, commercial businesses, schools, tourist attractions, or other places of interest. These different entities may be one factor in determining whether an object or an action of an object is unusual.

Figure 5:
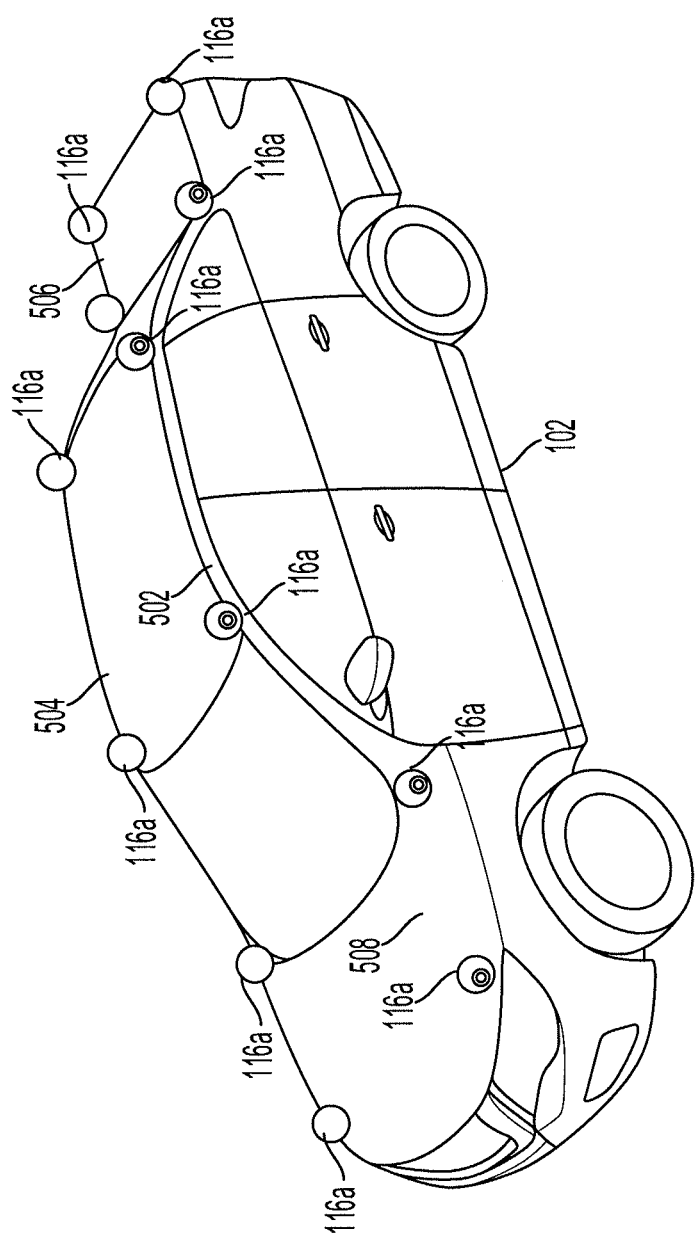
FIG. 5 shows an example illustration of the positioning of one or more external cameras of the detection system of FIG. 1 on the vehicle according to an aspect of the invention.

The one or more sensors 114 may include one or more external cameras 116*a*, one or more internal cameras 116*b*, a vehicle speed sensor 118 and/or other sensors 136. The one or more external cameras 116*a* may include multiple cameras positioned on the outside of the vehicle 102 and/or within the vehicle 102 but directed outward to capture different views of the surrounding environment outside the vehicle 102, as shown in FIG. 5 for example. The one or more external cameras 116*a* may be positioned along a frame 502 of the vehicle 102, such as along the roof 504, the trunk 506 or front 508 of the vehicle 102. The different views of the surrounding environment may be used to form a panoramic or 360 degree image of the surrounding environment outside the vehicle 102. The one or more external cameras 116*a-b* may capture image data that includes a single frame or image or a continuous video of the surrounding environment outside the vehicle 102.

Figure 6:
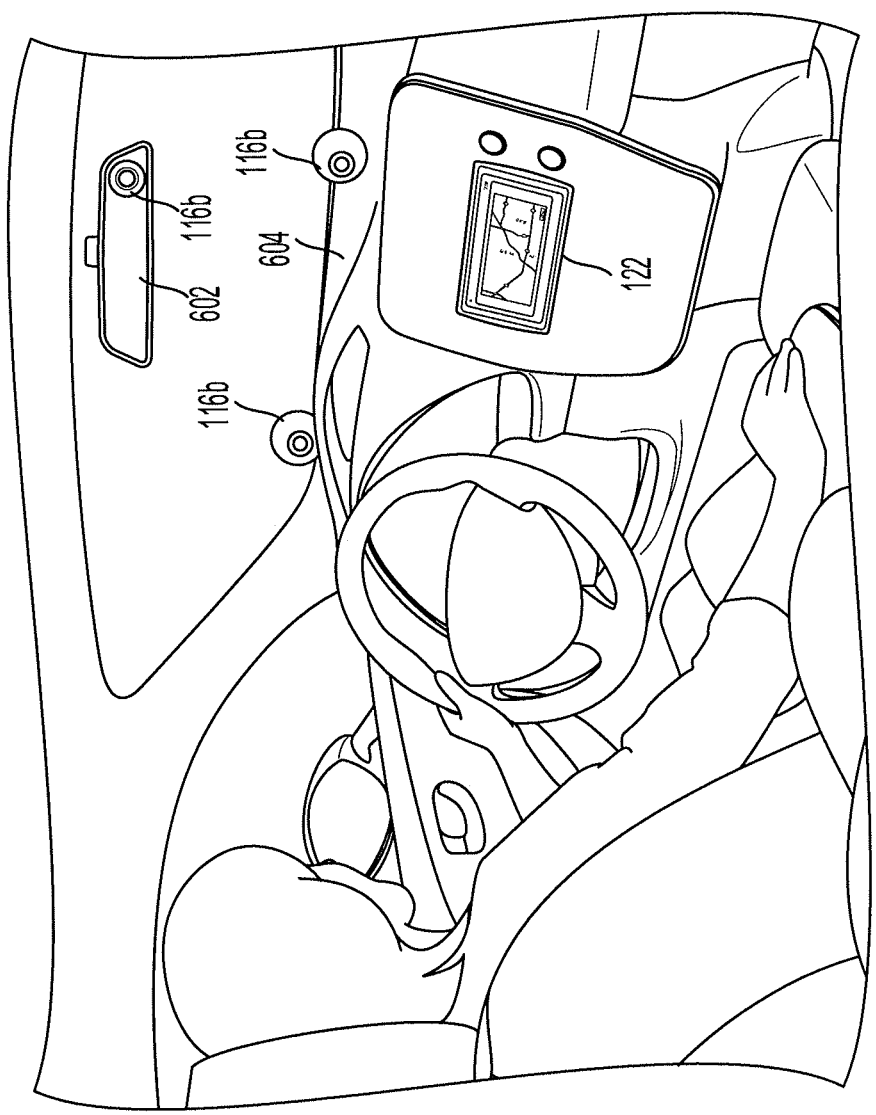
FIG. 6 shows an example illustration of the positioning of one or more internal cameras of the detection system of FIG. 1 within the vehicle according to an aspect of the invention.

The one or more internal cameras 116*b* may include multiple cameras positioned within the vehicle 102 to capture different views within the cabin of the vehicle 102, as shown in FIG. 6 for example. The one or more internal cameras 116*b* may be positioned within the vehicle 102, such as on the rearview mirror 602 or in the corner of the dashboard 604. The one or more internal cameras 116*b* may capture image that includes a single frame or image or a continuous video of the environment inside or within the vehicle 102. The different views within the vehicle may be used to form the panoramic or 360 degree image of the entire cabin, which allows the detection system 100 to capture any nefarious or unusual activities within the vehicle 102, such as an individual stealing items from within the vehicle 102 or hot wiring the vehicle 102.

The one or more sensors 114 may include a vehicle speed sensor 118. The vehicle speed sensor 118 may measure the amount of rotation of the multiple wheels to determine whether the vehicle 102 is stationary and/or parked. The one or more sensors 114 may include other sensors 136 to measure the road condition, the weather, the ambient lighting surrounding the vehicle 102 or other environmental factors that may be used to determine whether there is unusual activity.

The detection system 100 may include an output device 124. The output device 124 may be an audio indicator, a visual indicator, a communication device or other output device. The audio or visual indicator may be used to sound an alarm or flash an alarm, respectively, for example. The communication device may be used to contact the police, insurance company or other entity and provide recordings to the police, insurance company, or other entity. The communication device may notify or provide documentation to the owner of the vehicle 102 that an unusual activity in proximity to the vehicle 102 is about to occur, has occurred or is occurring.

The detection system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed.

The detection system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database or behavioral model database that provides models of normal motions and/or features of different objects. The external database 104 may be updated and/or provide updates in real-time. The external database 104 may store and/or provide the models to the ECU 108. The external database 104 may also store environmental factors, such as weather information or time of day information, and provide the environmental factors to the ECU 108 to assist in determine whether an object or an action of the object is unusual or otherwise different from a baseline. The weather information may include the temperature, weather, road conditions, amount of precipitation and/or other weather factors that may affect the determination of an unusual activity. For example, when the weather is cold and there is precipitation, the detection system 100 is less likely to find a person in a bulky winter jacket with a scarf and other headwear that may cover their face unusual than when the weather is hot and humid.

Figure 2:
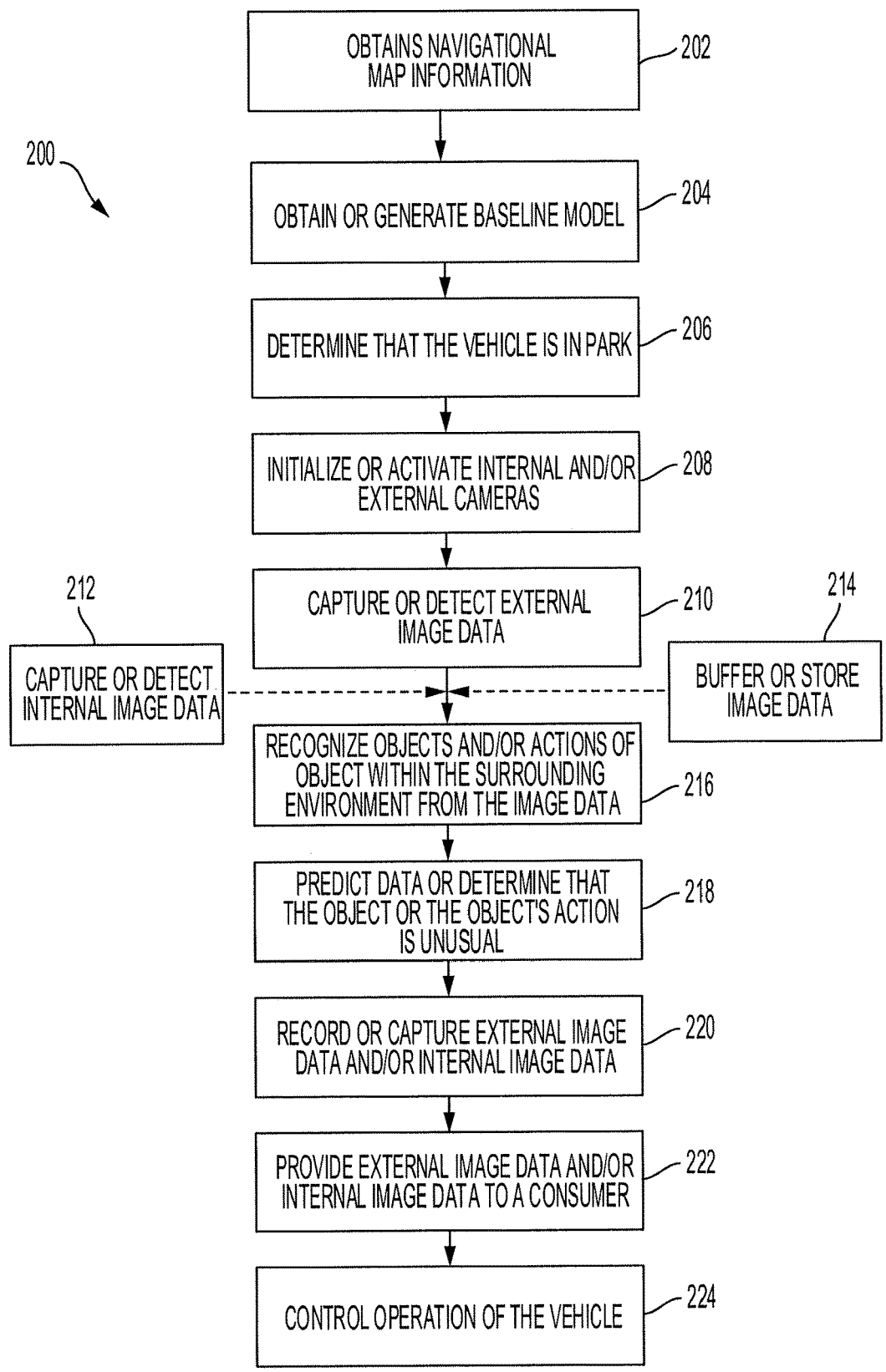
FIG. 2 is a flow diagram of an example process for predicting and/or detecting an unusual activity using the detection system of FIG. 1 according to an aspect of the invention.

FIG. 2 is a flow diagram of an example process 200 for predicting and/or detecting an unusual activity. One or more computers or one or more data processing apparatuses, for example, the ECU 108 of the detection system 100 of FIG. 1, appropriately programmed, may implement the process 200.

The detection system 100 obtains navigational map information (202). The detection system 100 may use the navigation unit 112 to obtain the navigational map information including a current location of the vehicle 102 and other entity information, such as places of interest in proximity or within a threshold distance of the vehicle 102. The detection system 100 may extract the current location and/or the other entity information from the navigational map information. For example, the detection system 100 may use a GPS system to determine the current location of the vehicle 102. In some implementations, the detection system 100 may provide the current location of the vehicle 102 to an external database 104 to obtain nearby entity information to identify different places of interest in proximity to the vehicle 102 and/or weather information.

Once the detection system 100 obtains the current location of the vehicle 102, the detection system 100 may obtain or generate a baseline or a baseline model of objects, coupled objects and/or motions of the object for a given location (204). The detection system 100 uses the baseline or the baseline model to predict, determine or otherwise detect unusual activities. For example, the detection system 100 may predict when a bystander may attempt to steal or otherwise break into the vehicle 102.

The baseline or the baseline model may be based on the current location of the vehicle 102 and other environmental factors. The current location of the vehicle 102 and other environmental factors may affect the sensitivity of the detection system 100 to trigger the detection of an unusual activity. For example, the typical or general foot traffic in a shopping mall, park, baseball stadium, restaurant or other entity may be different than the foot traffic in a residential area. In another example, when the vehicle 102 is parked in a dark alley way the likelihood of an unusual activity is more than when the vehicle 102 is parked in a well-lit residential or commercial area. Thus, the baseline or baseline model used will be different when the vehicle 102 is parked in different locations. This allows the detection system 100 to adapt to different environmental variables in establishing an appropriate baseline.

Figure 3:
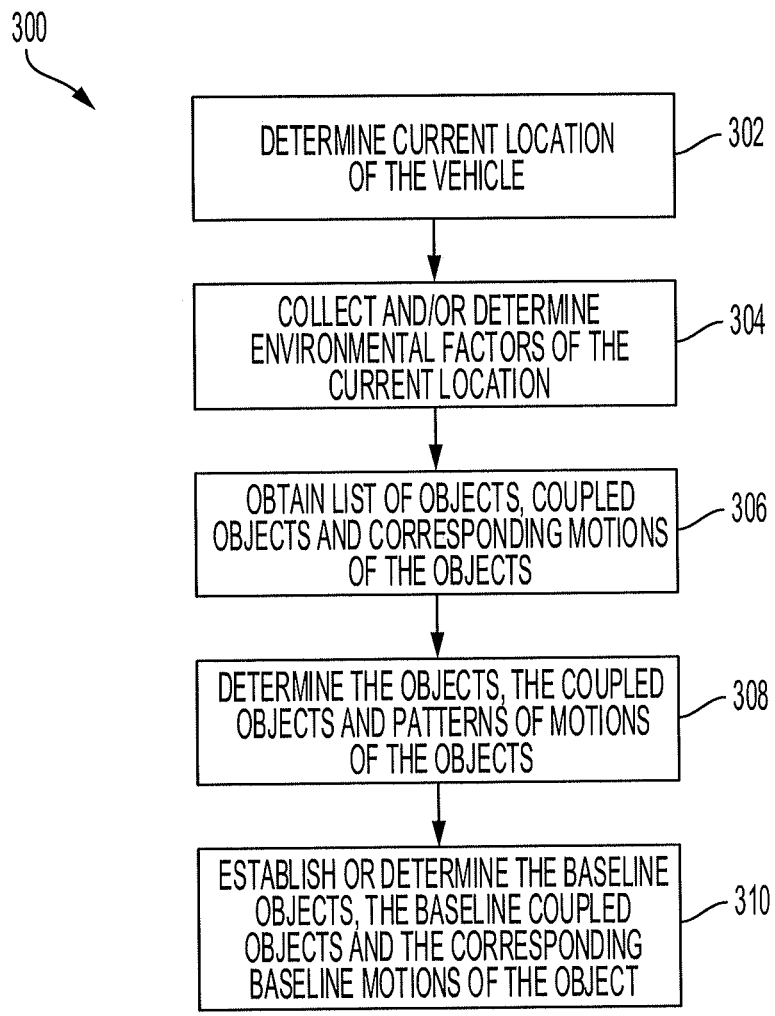
FIG. 3 is a flow diagram of an example process for generating, establishing or otherwise determining the baseline or normal objects and the baseline or normal actions of the baseline objects using the detection system of FIG. 1 according to an aspect of the invention.

The detection system 100 may provide the current location of the vehicle 102 to the external database 104. In response, the external database 104 may provide the corresponding baseline or the baseline model to the detection system 100, which the detection system 100 receives. In some implementations, the detection system 100 generates the baseline or the baseline model. FIG. 3 further describes the generation of the baseline or the baseline model. The generation and use of the baseline or the baseline model allows the detection system 100 to predictively determine when an unusual activity is about to occur. By modeling the typical objects, coupled objects and/or motions of the objects within the environment, the detection system 100 adaptively uses machine learning to predict an object or an action of an object that is not consistent with the surrounding environment of a location, and thus, predict that the object or an action of the object may be unusual.

The detection system 100 may determine that the vehicle 102 is in park or otherwise not moving (206). The detection system 100 may use the vehicle speed sensor 118 to measure the speed of the vehicle 102 and may determine that the vehicle is in park when the speed is approximately 0 mph. In some implementations, the detection system 100 determines the gear that transmission 132 is in and may determine that the vehicle 102 is parked when the transmission 132 is in a locked state or in a park mode. In some implementations, the detection system 100 may determine that the engine and/or ignition is off, and thus, the vehicle 102 must be in park if the engine and/or the ignition is off.

When the vehicle 102 is parked, the detection system 100 may initialize or activate the cameras 116a-b (208). The detection system 100 may turn on the one or more external cameras 116a and/or the one or more internal cameras 116b when the vehicle 102 is parked. In some implementations, the detection system 100 may only turn on the one or more external cameras 116a in response to the vehicle 102 being parked to minimize the use of electrical energy, and then, the detection system 100 may turn on the one or more internal cameras 116b only when an unusual activity is predicted or detected.

Since the vehicle is parked, the engine 128 may be off, and thus, the one or more cameras 116a-b may rely on electrical energy from the battery 130. As such, the one or more cameras 116a-b may operate in a low powered state, when activated. The low powered state minimizes resource intensive tasks, such as buffering and storing captured image data, to a limited amount of time or size, which increases energy efficiency. Moreover, the one or more cameras 116a-b may limit communication between the one or more cameras 116a-b and the ECU 108 and/or the memory 110 in the low powered state.

Once the detection system 100 initializes or activates the one or more cameras 116a-b, the detection system 100 may use the one or more cameras 116a-b to capture image data. The image data may be a single frame image and/or a multi-frame video. The single frame image and/or the multi-frame video may be stored or buffered in the memory 110. In particular, one or more external cameras 116a may capture image data of the surrounding environment outside the vehicle 102 (210). The one or more external cameras 116a may be positioned on an exterior of the vehicle 102 or within the interior of the vehicle 102 but directed outward toward the surrounding environment outside the vehicle 102. Each of the one or more external cameras 116a may capture a different image of a different perspective of the surrounding environment outside the vehicle 102 such that together all of the one or more external cameras 116a may capture a 360 degree perspective view of the surrounding environment. The different images may be later stitched, merged or otherwise combined to form a panoramic image and/or video.

One or more internal cameras 116b may also capture image data of the environment within the vehicle 102 (212). The one or more internal cameras 116b may be positioned within an interior of the vehicle 102 and directed toward the interior cabin of the vehicle 102 to monitor or capture image data of occupants within the vehicle 102. Each of the one or more internal cameras 116b may be directed to different portions of the interior cabin of the vehicle 102, such as the front cabin, rear cabin, and/or the driver-side and/or passenger side of the cabin. The one or more cameras 116b may also be positioned within a trunk of the cabin to capture image data within the trunk of the vehicle 102. The image data captured by the one or more internal cameras 116b may be a single frame image and/or a multi-frame video. The single frame image and/or the multi-frame video may be stored or buffered in the memory 110. Different perspectives and/or views may be captured and later stitched, merged or otherwise combined to form a panoramic image and/or video. The image data among all the cameras 116a-b may be combined or otherwise coalesced into an image or video that captures the entire environment inside and outside the vehicle for a time period.

After the one or more cameras 116a-b begin to capture image data, the detection system 100 may buffer or store the image data in the memory 110 (214). The memory 110 may reserve a set amount of memory or storage space, such as approximately 350 MB-700 MB of data, or about 30-60 minutes worth of captured video recordings in standard definition for the buffer of the image data. The amount of storage reserved for the captured data may be pre-determined or user-configurable and allows enough image data to be captured to provide a record of any unusual activities without consuming a significant amount of resources and/or capacity.

The detection system 100 recognizes objects and actions of the objects from the image data (216). In order to recognize the different objects and actions of the objects within the image data, the detection system 100 may segment, outline or otherwise map figures within the image data using multiple joints and segments. The segments may represent linear representations or outlines of an object and the joints may represent vertices, contours or other angles between the different segments.

Once the outline of the object is mapped, the detection system 100 may compare the representation of the multiple joints and segments to a database of objects, which have already been mapped, to identify the object. For example, the detection system 100 may compare an outline of a person within the surrounding environment to a stored outline of a person and determine that the shape of the outlines match, and so the detection system 100 recognizes the object as a person. Additionally, the detection system 100 may recognize that the person is holding a coupled object and identify the coupled object being held by the person, such as a wrench, a bat, a crowbar or other object. And on the person, the detection system 100 may recognize other different coupled objects, such as a hood, glasses, boots, gloves or other clothing objects. In another example, the detection system 100 may recognize an approaching vehicle, such as a vehicle backing up or backing in toward the vehicle 102.

The detection system may outline the shape of these objects using segments and joints to represent the linear representations and the changes in the angle of the linear representations, respectively, and then compare the outlined shape to different outline shapes of different objects or combination of objects in a database. When the outline of the object matches or is within a threshold error of one of the outlined shapes in the database, the detection system 100 may determine that the outlined object is the matched object in the database.

Once the object is recognized, the detection system 100 may map the actions of the objects, and similarly compare the actions of the objects to different motions in the database for the object to determine a type of action that is occurring or is about to occur. The detection system 100 tracks the object over a period of time. For example, the detection system 100 follows the segments and joints that represent the object over a period of time, such as the other vehicle backing up or backing in toward the vehicle 102, to determine the motion of the object including a direction and speed of the motion.

Figure 4:
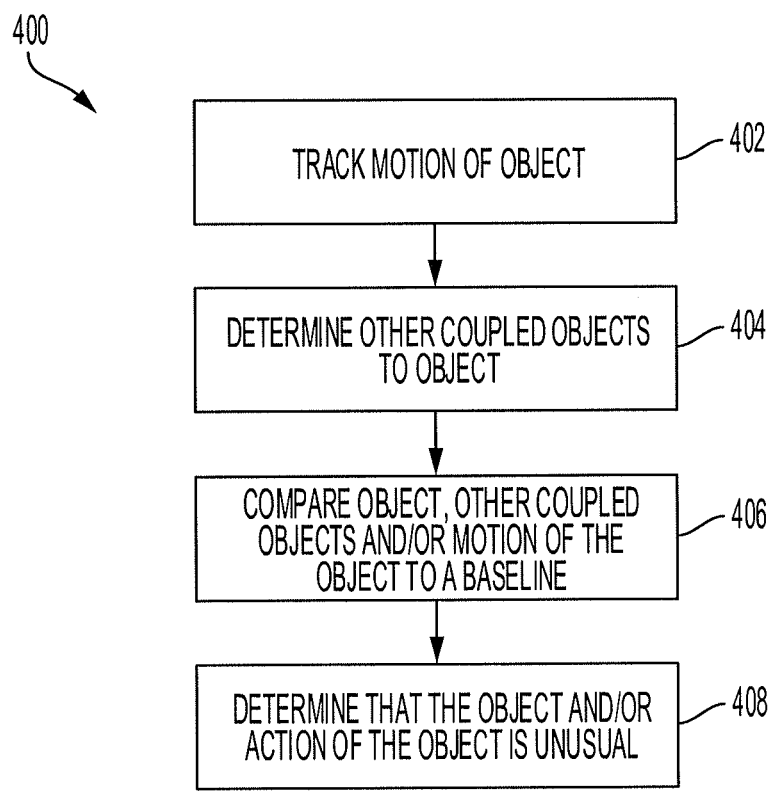
FIG. 4 is a flow diagram of an example process for determining whether an object or an action of the object is unusual within the surrounding environment outside and/or inside the vehicle using the detection system of FIG. 1 according to an aspect of the invention.

The detection system 100 predicts or determines that the object or an action of the object is unusual (218). The detection system 100 predicts or determines that the object or the action of the object is unusual before the object contacts the vehicle 102, and thus, the detection system 100 is predictive and anticipates the unusual activity before the actual occurrence. The detection system 100 may predict or determine the unusual activity using a machine learning algorithm that utilizes a baseline or a baseline model to make the prediction or determination using patterns. An object is unusual when the object does not belong within the surrounding environment, such as when the object does not usually appear in the surrounding environment. The detection system 100 may determine that the object does not usually appear in the surrounding environment when the object that is recognized is not part of the baseline of the surrounding environment. An action of the object is unusual when the motion of the object presents a threat to the vehicle 102, such as when the object may collide with the vehicle 102, or when the action of the object is not consistent with a regular motion of the object within the baseline of the surrounding environment. One example of an unusual action of an object is when another vehicle is backing up or backing in toward the vehicle 102 at a speed greater than a threshold limit and/or the other vehicle comes within a threshold distance of the vehicle 102, which may signify that the other vehicle is unaware of the presence of the vehicle 102. FIG. 4 further describes the process 400 by which the detection system 100 predicts or determines that the object or the action of the object is unusual.

In response to detecting an object or an action of an object that is unusual, the detection system 100 may record or capture the external image data and/or the internal image data (220). When the detection system 100 detects the unusual object and/or action using one or more external cameras 116a, the detection system 100 may activate the one or more internal cameras 116b if the one or more internal cameras 116b are not already activated.

The detection system 100 may already be buffering the external image data and/or the internal image data in the memory 110 prior to detecting that the object or the action of the object is unusual. When the detection system 100 detects that the object or the action of the object is unusual, the detection system 100 may set a timer to stop the buffering of the external and/or internal image data after a set amount of time. When the set amount of time expires, the detection system 100 may stop the recording and/or capturing of the external image data and/or the internal image data and store the external image data and/or internal image data in the memory 110.

The set amount of time may be pre-configured or configured via user input through the user interface 122. The set amount of time may be different for the internal cameras 116b and/or the external cameras 116a. For example, the recording of the internal image data may start later and/or end later than the recording of the external image data. This allows the internal cameras 116b to capture additional video or image data of any malicious activities that may have been caused, such as theft or damages, within the vehicle 102. In another example, the recording of the external image data and the internal image data may occur at the same time.

Any image data that is captured outside the window of when the buffered image data begins and when the set amount of time ends may be deleted or otherwise removed from the memory 110 to save computing resources. Since the buffered external image data and/or internal image data begins recording before the unusual object or action is detected and until the set amount of time afterwards, the detection system 100 records and stores external and/or internal image data before, during and after the unusual activity.

The detection system 100 may provide the external and/or internal image data to a consumer (222). A consumer is a computing device of a person, a government agency, a business or other entity that may use the external and/or internal image data. For example, a government agency, such as the police department, may use the external and/or internal image data to identify a suspect that is identified as an object that is unusual. In another example, the detection system 100 may provide the external image data that includes image data of the vehicle that collided with the vehicle 102 including the license plate number, make and model of the vehicle and circumstances of the accident, to an insurance company to accompany a claim. When an unidentified person enters the vehicle 102, the captured internal image data may capture the actions of the unidentified person. The recorded information may allow for a claims adjuster or owner of the vehicle 102 to identify any lost or stolen items from within the vehicle 102.

In some implementations, the detection system 100 may provide the external image data to the police or other third-party to identify the object. In response, the detection system 100 may receive an indication from the police or third-party that confirms or identifies the object as unusual. For example, the external image data may be an image of a person's face. The detection system 100 may analyze the image data and identify facial features of the suspect to send to the government agency or external database 104 to determine whether the suspect is suspicious. In response, the government agency or external database 104 may identify the person as having a criminal background and alert the detection system 100 of the person's criminal background. Subsequently, the detection system 100 may determine that the object, e.g., the person with the criminal background within the vicinity of the vehicle 102, is unusual based on the alert received from the government agency or external database 104 and may begin recording.

The detection system 100 may operate or control one or more vehicle components in response to the detecting the object that is unusual and/or action of the object that is unusual (224). The detection system 100 may alert and notify a third-party, such as the owner of the vehicle 102, the police or a security service provider when the unusual object or action is detected, for example. The detection system 100 may perform other actions, such as disable the ignition, lock the doors, activate a GPS device to provide location information of the vehicle 102, close the windows, or activate an audio and/or visual alert to prevent an unidentified person from starting or gaining access to the vehicle 102.

FIG. 3 is a flow diagram of an example process 300 for generating, establishing or otherwise determining the baseline or normal objects and the baseline or normal actions of the objects within the surrounding environment outside and/or inside the vehicle 102. One or more computers or one or more data processing apparatuses, for example, the ECU 108 of the detection system 100 of FIG. 1, appropriately programmed, may implement the process 300.

The detection system 100 determines a current location of a vehicle 102 (302). The detection system 100 may use the navigation unit 112 to obtain navigational map information and extract the current location of the vehicle 102 from the navigational map information. In some implementations, the detection system 100 may interact and receive the current location of the vehicle 102 via a GPS device coupled to the vehicle 102, such as by using the location services of a smartphone.

After the detection system 100 determines the current location of the vehicle 102, the detection system 100 collects or determines other environmental factors at the current location and associates the other environmental factors with the current location (304). The detection system 100 may extract some or all of the other environmental factors from the navigational map information. For example, the detection system 100 may extract weather information, the time of day, and information about one or more surrounding entities, such as places of business or interest in proximity to the current location from the navigational map information or may retrieve the information from the external database 104. These environmental factors may be used to determine objects within the baseline and/or baseline model. The weather information may include the surrounding temperature outside the vehicle 102 and/or the type and amount of precipitation at the current location of the vehicle 102.

In some implementations, the detection system 100 uses one or more other sensors 136 to measure, detect or otherwise determine one or more other environmental factors. The one or more other sensors 136 may be a light sensor that measures the amount of light at the current location and/or a temperature sensor that measures the ambient temperature surrounding the outside of the vehicle 102, for example. The amount of light and/or the weather outside may affect the likelihood of an unusual activity resulting in a malicious act. For example, unusual activity is more likely to occur during the evening or night when the surrounding environment is dark and when the weather is comfortable, such as when the temperature is warm and not raining. In some implementations, the detection system 100 provides the current location of the vehicle 102 to an external database 104 and obtains environmental factors, such as crime statistics for the location and/or local weather information to use in generation of the baseline or baseline model. The crime statistics may affect the likelihood of unusual activity in the area, and so, the detection system 100 may adjust a sensitivity of the detection system 100 to account for the local criminal behavior.

The detection system 100 may provide the different environmental factors and the current location of the vehicle 102 to the external database 104, and in response, obtain a corresponding baseline including objects that are normally present at the current location along with motions typical of the objects (306). The external database 104 may account for the time of day, the weather, and other surrounding entities to determine the baseline. For example, when the weather is cold, a person wearing a significant amount of clothing including a heavy jacket, a scarf, and headwear that covers their face would be within the baseline and normally present, but when the weather is hot, the heavy jacket, the scarf and the headwear would be unusual. In another example, during the daytime when there is light, sun glasses would be normal and within the baseline, but during the evening, the sun glasses would be unusual. In another example, the baseline may be different when the current location of the vehicle 102 is near different types of business entities. When the current location of the vehicle 102 is near a baseball stadium, a baseball and/or a baseball bat may be considered an object that is normally found in proximity to the current location, for example.

In some implementations, the detection system 100 may collect enough sample data of the different environmental factors for the current location of the vehicle 102 and determine the objects and the patterns of motions of the objects that correspond to the current location (308). The detection system 100 may recognize objects within the surrounding environment and determine a frequency that those objects appear in the surrounding environment. When those objects appear in the surrounding environment more than a threshold number of times, the detection system 100 may determine that those objects are part of the baseline within the surrounding environment. Similarly, the motions of the objects may be tracked and when the motions of the objects are repeated a number of times, the detection system 100 may determine that there is a pattern of motions and those motions are part of the baseline motions for those objects within the surrounding environment. For example, when the weather is cold and/or there is snow on the ground, a person walking back and forth around the parking lot performing a repetitive upward shoveling motion with a shovel would be captured by the detection system 100 a number of times greater than a threshold amount and may would be considered normal and part of the baseline.

As the detection system 100 collects more sample data, the detection system 100 may continuously update the baseline objects, baseline coupled objects and/or baseline motions of the baseline objects associated with the location and different environmental factors. For example, as an object appears more frequently and/or is present in a larger percentage of the sample size, the detection system 100 may increase a likelihood that that the object is normal, not unusual and is likely part of the baseline. Whereas, if an object appears less frequently and/or present in a smaller percentage of the sample size, the detection system 100 may decrease a likelihood that the object is normal, not unusual and less likely part of the baseline. The percentage or frequency necessary for inclusion in the baseline may be pre-determined and/or user-configured. In a similar manner, the detection system 100 may update the baseline coupled objects and/or baseline motions of the baseline object.

The detection system 100 may recognize other objects coupled to the object. When the detection system 100 finds that another object is frequently or occasionally coupled to the object, such a percentage of times greater than a threshold amount based on the current location and/or other environmental factors, the detection system 100 may associate the other object as a coupled object to the object as part of the baseline.

When the objects and motions of the objects that occur within the surrounding environment are identified or otherwise determined, the detection system 100 establishes or determines the baseline objects, baseline coupled objects and/or baseline motions of the baseline objects (310). The baseline objects, coupled objects, and/or motions of the objects establish the baseline of the surrounding environment at the current location when the one or more environmental factors are present. These baseline objects, coupled objects and/or motions of the objects assist the detection system 100 to anticipate, predict or determine when an object, coupled object and/or motion of the object is unusual.

FIG. 4 is a flow diagram of an example process 400 for determining whether an object or an action of the object is unusual within the surrounding environment outside and/or inside the vehicle 102. One or more computers or one or more data processing apparatuses, for example, the ECU 108 of the detection system 100 of FIG. 1, appropriately programmed, may implement the process 400.

Once the detection system recognizes the object within the surrounding environment, the detection system 100 tracks the motion of the object (402). The detection system 100 may track, follow or otherwise map the different segments and/or joints that represent the object over time from the image data to determine the motions of the different segments and/or joints. For example, an individual's arm may be represented by a segment between two joints and when the individual's arm swings downward, the segment representing the individual's arm will have a downward angular motion over a period of time.

The detection system 100 may identify or otherwise determine other objects coupled to the object (404). An object may be coupled to multiple other objects. For example, the object may identify a person as an object within the surrounding environment outside the vehicle 102. The person may be coupled to multiple other objects, such as sunglasses, a scarf, a jacket or other clothing accessory or be holding another object, such as a crowbar, bat or other object. When the detection system 100 identifies or otherwise determines that the object is a person, for example, the detection system 100 may identify other objects, such as a jacket, scarf, or crowbar that the person may be wearing or holding, for example. The detection system 100 may outline an object within the image data and determine that the object is composed of two or more different and distinct outlines, which each represent a different object, and thus, the detection system 100 may determine that each different and distinct outline of the two or more different and distinct outlines is actually a different object coupled to one another.

The detection system 100 compares the object, the other objects coupled to the object and/or the motion of the object to a baseline (406). The baseline may correspond to and/or be associated with the current location of the vehicle 102 and the environment factors at the current location of the vehicle 102. The baseline may be established, as described above in FIG. 3. The detection system 100 may compare the object to the baseline objects within the within the surrounding environment and determine whether the object belongs within the surrounding environment. That is, the detection system 100 may determine whether the object matches one of the baseline objects. For example, if the vehicle 102 is at a movie theater, the baseline of the movie theater would not likely include a grocery cart, and thus, if the vehicle 102 identified the object as a grocery cart approaching the vehicle, the detection system 100 may determine that the grocery cart is an unusual activity because the grocery cart is not within the baseline related to the location of the movie theater.

With respect to the other objects coupled to the object, the detection system 100 may compare the other objects to the baseline coupled objects, which may be normally found coupled to the object, based on the current location and current environmental factors. For example, when the time of day is during the day, the weather is hot, and the sun is shining brightly, the baseline coupled objects may include sunglasses, a baseball cap, and/or a hat. Thus, the detection system 100 may identify that a person around the vehicle 102 is wearing sunglasses, a baseball cap and/or a hat and not find the person unusual, whereas, during the evening, the detection system 100 may determine that the same person wearing the sunglasses in the evening would be unusual.

Similarly, the detection system 100 may compare the motions of the object with baseline motions of the object, which may be normally associated with the object. The baseline motions of the object may be based on the current location of the vehicle 102 and the associated environmental factors. For example, when the vehicle 102 is parked in a parking lot on a snowy day and the detection system 100 detects that an individual is in proximity of the vehicle 102 with a shovel, the baseline motions of the object may include an upward angular motion of the shovel, which may represent the individual shoveling snow with the shovel because a shovel is generally associated with an upward angular motion. Other factors when comparing the motions of the object with baseline motions of the object include the speed, angle and direction of the motions of the object. For example, if the speed of the motion of the object toward the vehicle 102 is greater than the speed of the baseline motion, such as when a person is running toward the vehicle 102 or an object is thrown toward the vehicle 102, the detection system 100 may determine that the motions are different and that the motion of the object is unusual. Similarly, if the direction of the motion of the object is toward the vehicle, such as when an individual is using a shovel to hit the vehicle 102, whereas, the baseline motion of the object is typically directed away from the vehicle 102, such as when an individual is shoveling snow away from the vehicle, the detection system may determine that the motions are different and that the motion of the object is unusual.

In some implementations, the detection system 100 uses a comparison of a combination of the object, the coupled objects and/or the motions of the object to the baseline object, the baseline coupled objects and/or the baseline motions of the baseline object to determine or predict whether there is an unusual activity. For example, when the vehicle 102 is parked in a parking lot on a snowy day and the detection system 100 detects that an object, such as an individual, is in proximity of the vehicle 102 with a shovel during the day time, the detection system 100 may determine that the object, i.e., the individual, is not unusual because the vehicle 102 is in a public parking lot during the day time. Additionally, the detection system 100 may determine that the individual holding the shovel is not unusual because the weather is snowy. Moreover, the individual may be performing an upward angular motion with the shovel, and the detection system 100 may determine that the upward angular motion with the shovel is not unusual because the motion corresponds to the shoveling of snow in the parking lot. However, if the individual is performing a downward motion with the shovel, the detection system 100 may determine that the motion is unusual because a downward angular motion with the shovel may indicate that the individual is using the shovel in an unusual manner, such as to break a window. Thus, the detection system 100 may use a combination of the object, one or more coupled objects and the motion of the object to determine whether the object or the action of the object is unusual.

The detection system 100 determines that the object and/or the action of the object is unusual (410). The detection system 100 determines that the object and/or the action of the object is unusual when the object, the coupled objects and/or the motions of the object are different than the baseline objects, the baseline coupled objects and/or the baseline motions of the baseline object.

The object may be different than the baseline objects when the object does not match one of the baseline objects, such as when the object has not previously appeared in the surrounding environment a threshold number of times to be included within the baseline. The coupled objects may be different than the baseline coupled objects when the coupled object has not previously appeared coupled with or in conjunction with the object a threshold number of times to be included within the baseline. The motions of the object may be different than the baseline motions of the baseline object when the motions have not previously appeared in conjunction with the object a threshold number of times to be included within the baseline.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A detection system for a vehicle, comprising:
a first camera configured to capture a first image data of a surrounding environment including a plurality of objects within the surrounding environment;
a memory configured to store image data; and
an electronic control unit coupled to the first camera and the memory and configured to:
obtain, from the first camera, the first image data of the surrounding environment,
recognize the plurality of objects within the first image data of the surrounding environment,
determine a plurality of standard objects that previously appeared in the surrounding environment based on a type of business entity within a threshold distance of the vehicle,
determine that an object among the plurality of objects within the surrounding environment is a different object than the plurality of standard objects that previously appeared in the surrounding environment, the plurality of standard objects being a different set or different types of objects when the vehicle is located at different locations, and
record and capture, in the memory and using the first camera, the first image data for a time period before and after the determination.

2. The detection system of claim 1, wherein the electronic control unit is configured to:
determine the plurality of standard objects that previously appeared in the surrounding environment further based on weather.

3. The detection system of claim 2, wherein the plurality of standard objects are different when the weather is different.

4. The detection system of claim 1, wherein the electronic control unit is configured to:
determine a plurality of other objects coupled to the object.

5. The detection system of claim 1, wherein to determine that the object among the plurality of objects within the surrounding environment is a different object than the plurality of standard objects the electronic control unit is configured to:
compare the object to the plurality of standard objects that previously appeared in the surrounding environment; and
determine that the object does not match any of the plurality of standard objects.

6. The detection system of claim 1, wherein to determine that the object among the plurality of objects within the surrounding environment is a different object than the plurality of standard objects the electronic control unit is configured to:
compare a motion of the object with a plurality of standard motions; and
determine that the motion of the object does not match any of the plurality of standard motions.

7. The detection system of claim 1, further comprising:
a second camera configured to capture a second image data, wherein the first image data is an external video of the surrounding environment and the second image data is an internal video within the vehicle.

8. The detection system of claim 7, wherein the electronic control unit is configured to:
record and capture, in the memory and using the second camera, the second image data for the time period in response to the determination.

9. The detection system of claim 1, wherein the electronic control unit is configured to control an operation of the vehicle to prevent access to the vehicle while the vehicle is stationary including locking one or more doors of the vehicle or closing one or more windows of the vehicle to prevent a person from gaining access to the vehicle.

10. The detection system of claim 1, wherein the electronic control unit is configured to control an operation of the vehicle to prevent the vehicle from starting including disabling an ignition of the vehicle to prevent a person from starting the vehicle.

11. A detection system for a vehicle, comprising:
an external camera configured to capture a first image data of an environment outside the vehicle including a plurality of objects within the environment outside the vehicle;
an internal camera configured to capture a second image data of an environment inside the vehicle;
a memory configured to store the first image data and the second image data; and
an electronic control unit coupled to the external camera, the internal camera and the memory and configured to:
obtain, from the external camera, the first image data,
recognize the plurality of objects within the environment outside the vehicle,
determine standard objects that previously appeared in the environment outside the vehicle based on a type of business entity within a threshold distance of the vehicle,
determine that an object among the plurality of objects within the environment outside the vehicle is a different object than the standard objects that previously appeared in the environment outside the vehicle, the standard objects being a different set or different types of objects when the vehicle is located at different locations,
record and capture, in the memory and using the external camera and the internal camera, the first image data and the second image data for a time period before and after the determination, and control an operation of the vehicle to prevent access to the vehicle while the vehicle is stationary or to prevent the vehicle from starting.

12. The detection system of claim 11, wherein to record and capture the first image data and the second image data for the time period the electronic control unit is configured to:
   store, in the memory, the first image data and the second image data for the time period before and after the determination; and
   delete any portions of the first image data and the second image data that occur outside the time period before and after the determination.

13. The detection system of claim 11, wherein the electronic control unit is configured to:
   determine a motion of the object; and
   determine a plurality of other objects coupled to the object.

14. The detection system of claim 13, wherein the electronic control unit is configured to:
   compare the motion of the object with standard motions; and
   determine that the motion of the object does not match any of the standard motions.

15. The detection system of claim 11, wherein the electronic control unit is configured to:
   determine that the vehicle is parked; and
   activate the external camera and the internal camera.

16. A method for detecting unusual activities surrounding a vehicle, comprising:
   obtaining, from a first camera, a first image data of a surrounding environment;
   recognizing a plurality of objects within the first image data of the surrounding environment;
   determining baseline objects that previously appeared in the surrounding environment based on a type of business entity within a threshold distance of the vehicle;
   determining that an object among the plurality of objects within the surrounding environment is a different object than the baseline objects that previously appeared in the surrounding environment, the baseline objects being a different set or different types of objects when the vehicle is located at different locations; and
   recording and capturing, in a memory and using the first camera, the first image data for a time period before and after the determination.

17. The method of claim 16, wherein obtaining the first image data of the surrounding environment includes capturing different views of the surrounding environment outside the vehicle.

18. The method of claim 16,
   wherein determining the baseline objects that previously appeared in the surrounding environment is further based on weather.

19. The method of claim 16, further comprising:
   recording and capturing, in the memory and using a second camera, a second image data for the time period in response to the determination.

* * * * *